United States Patent [19]

Day et al.

[11] 4,326,863

[45] Apr. 27, 1982

[54] CENTRIFUGAL DEGASSER

[75] Inventors: Roger W. Day; Sidney W. Dunavent; Elvis Rich, all of Houston, Tex.

[73] Assignee: Geosource Inc., Houston, Tex.

[21] Appl. No.: 170,714

[22] Filed: Jul. 21, 1980

[51] Int. Cl.³ .............................................. B01D 19/00
[52] U.S. Cl. ........................................ 55/171; 55/193; 55/199; 55/203; 55/408
[58] Field of Search .................... 55/41, 52, 55, 171, 55/184, 190, 193, 199, 201–203, 406, 408

[56] References Cited

U.S. PATENT DOCUMENTS

| | | | |
|---|---|---|---|
| 1,316,947 | 9/1919 | Wirth-Frey | 55/199 X |
| 1,693,034 | 11/1928 | Jensen | 55/52 X |
| 1,982,733 | 12/1934 | Forster | 55/405 |
| 2,216,542 | 10/1940 | Paige | 55/52 X |
| 2,306,265 | 12/1942 | Heald | 55/55 X |
| 2,593,294 | 4/1952 | Goldberg | 55/406 X |
| 2,908,652 | 10/1959 | Forrester | 55/52 |
| 3,271,929 | 9/1966 | Bowden et al. | 55/52 |
| 3,276,187 | 10/1966 | Harker et al. | 55/203 |
| 3,358,422 | 12/1967 | van der Schee | 55/52 |
| 3,358,425 | 12/1967 | Burnham, Sr. | 55/193 X |
| 3,856,483 | 12/1974 | Rumpf et al. | 55/52 X |
| 3,932,063 | 1/1976 | Butler | 55/406 X |
| 3,973,930 | 8/1976 | Burgess | 55/41 |
| 3,999,965 | 12/1976 | Burgess | 55/203 X |
| 4,066,552 | 1/1978 | Caine | 55/406 X |
| 4,084,946 | 4/1978 | Burgess | 55/199 X |
| 4,201,555 | 5/1980 | Tkach | 55/20 |

*Primary Examiner*—Robert H. Spitzer
*Attorney, Agent, or Firm*—Arnold, White & Durkee

[57] ABSTRACT

A centrifugal degasser is provided using the principal of centrifugal force to separate gas from a gas-cut flowable material such as drilling mud. The device passes a gas-cut material through a centrifugal force field to accomplish the degassing. The invention contemplates the slurry flowing through the degasser by entering it through the top and flowing downward or entering from the bottom and flowing upward. In either case the slurry moves through the force field to accelerate gravity settling of the continuous phase of the flowable material and to accelerate buoyant force gas bubble rising time.

13 Claims, 9 Drawing Figures

CENTRIFUGAL DEGASSER

BACKGROUND OF THE INVENTION

The present invention relates to a device for degassing liquids and slurry materials and more particularly to a device using a centrifugal force field for degassing drilling mud.

In the case of oil field drilling mud, the mud often comes in contact with gasses in the well which become dissolved due to the high operating pressures involved. As the mud rises toward the surface, the pressure is reduced and the gasses will evolve, i.e., become entrained in the mud. This will result in a reduction of the column "mud" weight. Upon reaching the surface the gasses must be removed before the mud reaches a mud pump for further recycling. If the gasses are not removed pump performance is jeopardized. If the gasses are allowed to remain in the used mud, upon recycling there is accelerated infusion of gas leading to blowout conditions. Finally, gassed muds tend to "bind" or "vapor lock" centrifugal pumps in use on the oil rigs.

There are presently several methods for degassing drilling mud. One method includes the spreading of the mud into thin layers or small droplets in the presence of a vacuum to accelerate bubble rise out of the mud. A second method includes impacting the mud droplets to help burst the bubbles in the presence of a vacuum for a combined effect. And a third method includes using high shear rates and impacting alone to release the bubbles.

Using any of these methods requires the movement of mud to and from the degasser. This may be accomplished by any one of the following methods:

(a) a mud jet eductor creates a vacuum that moves the mud into and out of the degasser;

(b) a vacuum pump creates a vacuum that moves the mud into the degasser and a centrifugal pump moves the mud out of the degasser; and (c) a low head centrifugal pump moves the mud into and out of the degasser.

These methods have the following major problems respectively:

(a) a large horsepower motor or engine driven pump is required to operate the mud jet eductor and a large space is required for the degasser;

(b) the centrifugal pump that is used to move the mud out of the degasser often vapor locks and a large space is required for the degasser; and, (c) the degasser using a low head centrifugal pump to move the mud does not degas effectively.

SUMMARY OF THE INVENTION

The degasser of the present invention overcomes the problems set forth above for existing degassers. The invention herein uses the principal of centrifugal force to separate gas from a flowable material as liquid or slurry such as drilling mud, for example. The device passes the gas-cut mud through a centrifugal force field to accomplish the degassing. In the present invention the slurry can either flow through the degasser by entering into the top and flowing downward or entering from the bottom and flowing upward. In either case, the slurry moves through the centrifugal force field generated within the device to accelerate gravity settling of the continuous phase of the mud and to accelerate buoyant force gas bubble rising time.

The present invention provides a centrifugal degasser having an annular-like casing with inlet and outlet ports for receiving gas-cut flowable material as a slurry and discharging degassed slurry, respectively. The inlet and outlet ports have predetermined diameters for inducing a differential pressure between the inside and outside of the casing for feeding and discharging the slurry material. A rotatable shaft is also provided and disposed longitudinally within the casing. The shaft may have a series of apertures intermittently spaced for providing a flow path for exiting gas bubbles extracted from the slurry material. The hollow shaft does not provide the only path for the extracted gas bubbles, as they also are able to flow in the vortex center created by the centrifugal force field, external to the hollow shaft.

Connected to the shaft are a plurality of paddles for moving the slurry in a rotary motion, thereby creating a centrifugal force field through which the slurry will move. The centrifugal force acting on the slurry creates a vortex and the slurry flows in an annular rotating layer. This force field induces the heavier liquid/solid phase of the slurry toward the inside wall of the casing while the gas dispersed within the slurry rises inwardly, i.e., out of the slurry towards the axis of rotation, and is released to the atmosphere through the apertures in the shaft or through the vortex external to the hollow shaft. A means for driving the shaft is also attached to the shaft. This means may be a motor or any other type of drive unit.

In one embodiment of the invention, the slurry enters from the top of the casing and proceeds through the casing where it is moved toward the inside wall by the paddles attached to the rotatable shaft. The degassed slurry is then discharged by gravity through the outlet port at the bottom of the casing. A vacuum device may also be operably associated with the rotatable shaft for exhausting the existing gasses from the hollowed shaft to the atmosphere. The degasser may also include a means for propelling the slurry upon entry into the casing for hastening the slurry feed and ultimate throughput. Finally, a flow diverter may be attached to the rotatable shaft in cooperation with the plurality of paddles for moving the slurry toward the inside wall of the casing.

In a preferred alternative embodiment, the inlet port is located at the bottom of the annular-like casing for feeding gas-cut mud through the degassing device. The rotatable shaft with paddles and drive unit are also provided in this embodiment. The shaft has apertures for removing gas bubbles to the atmosphere. The gas bubbles can also flow external to the hollow shaft in the vortex void created by the centrifugal force field, and exit to the atmosphere. In the preferred embodiment, an annular spillover chamber is located at the top of the casing for providing a means for accelerating the discharge of the degassed mud. In the preferred embodiment, an impeller may also be attached to the rotatable shaft for enhancing the gravity feed of the slurry into the casing. The casing is also provided with an exit aperture for removing gas to the atmosphere. A vacuum or fan can be attached to the casing at the exit aperture for purposes of enhancing the exhaust of the gas to the atmosphere.

The preferred alternative embodiment may also be provided with anti-swirl vanes to prevent a vortex from forming directly outside the inlet port thus inhibiting slurry flow into the casing.

A bottom seal baffle may be positioned adjacent to and perpendicular to the rotatable shaft in both embodiments described above, for preventing escape of exiting gasses into the slurry.

BRIEF DESCRIPTION OF THE DRAWINGS

Additional features and advantages of the present invention will be described in a detailed description of the invention in conjunction with the drawings where like numerals designate like parts in which.

DETAILED DESCRIPTION OF THE PREFERRED EMBODIMENTS

Figure 1:
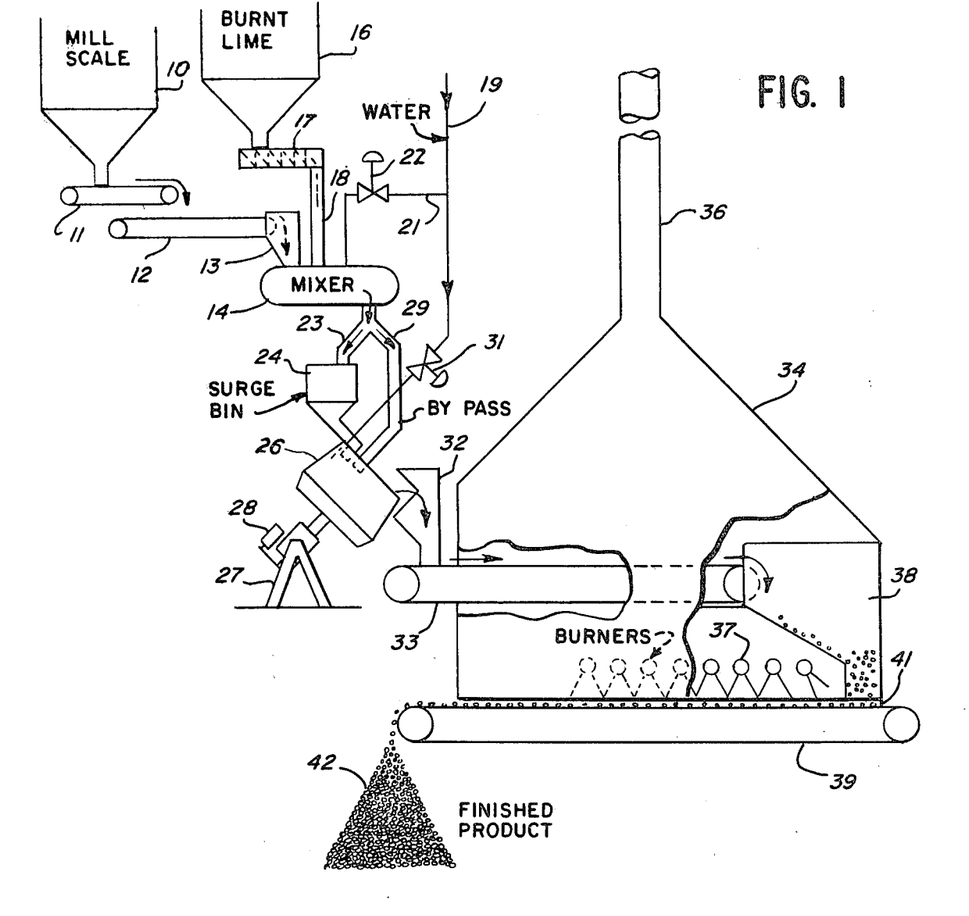
FIG. 1 is a cross-sectional view of a degasser in accordance with the present invention having a top entry inlet.

The degasser of the present invention is structurally capable of being placed inside a mud pit 10 as illustrated in FIG. 1. The degasser 12 includes a casing 14. The casing 14 is annular and includes an inlet port 16 and an outlet port 18. The casing 14 may be fabricated using a rigid material such as steel, hard plastic or cast iron.

A rotatable hollowed shaft 20 is longitudinally located within the casing 14. The rotatable shaft 20 has a series of apertures 22 spaced intermittently along the longitudinal axis of the shaft 20.

A plurality of paddles 24 are connected to the rotatable shaft 20 with a bolted connection so as to rotate a slurry material within the casing 14. A drive motor 26 is connected to the rotatable shaft 20 which will turn the shaft and the paddles 24 connected thereto in a direction 28. Both the shaft 20 and paddles 24 are fabricated using rigid materials such as steel. The paddles 24 are typically rectangular but may also be oblong and have dimensions in the range of 4-6 inches wide and 3 to 4 feet long.

Figure 2:
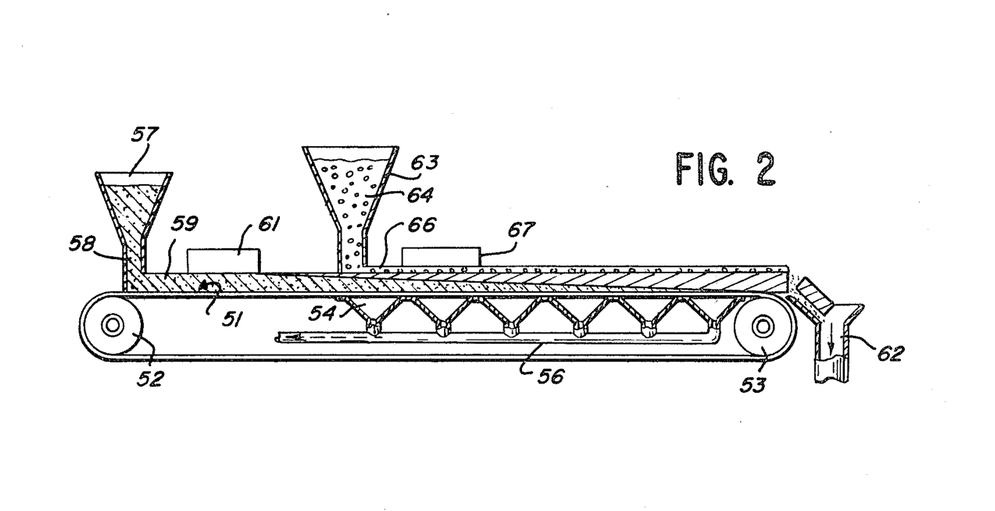
FIG. 2 is a cross-sectional view of the device shown in FIG. 1 further including a propeller.

Referring to FIG. 2 a plurality of propellers 30 are further connected to the rotatable shaft for purposes of enhancing the feed of slurry into the casing 14. The propellers 30 may be flat paddle-like units.

A conical flow diverter 32 is also provided which may be interconnected to the rotatable shaft and operably associated with the paddles 24.

Operationally, the centrifugal degasser 12 will receive a slurry material 34 containing gaseous substances designated by the gas bubbles 36. The gas-cut slurry 34 will enter the centrifugal degasser 12 through the inlet port 16 with a natural gravity feed. The motor 26 will rotate the propellers 30 and paddles 24. The rotation of the propellers 30 will enhance the feed of the slurry material 34 into the casing 14. As the slurry material enters the casing it will be diverted by the conical flow diverters 32 toward the inside wall of the casing 38. The paddles 24 will also rotate at the same rate as the propellers 30 due to the drive motor 26 and will cause the slurry 34 to take on a rotary motion in direction 28. The result of this rotary motion is a centrifugal field. The centrifugal force acting on the slurry creates a vortex such that the slurry flows in an annular rotating layer. The force field will cause the separation of the heavier liquid/solid phase of the slurry 34 directing it toward the wall 38 of the casing 14 while separating the gas phase of the slurry 34 and causing the gas bubbles 36 to exit through apertures 22 in the hollowed shaft 20. The gas bubbles will flow out the hollowed shaft to the atmosphere. The gas bubbles are also able to escape through the vortex center, external to the hollow shaft. A vacuum 40 may be used to assist in exhausting the gas bubbles 36 to the atmosphere. The heavier liquid/solid phase 42 will be discharged through outlet port 18 in the casing 14 and ultimately flow into the mud pit 10.

A bottom seal baffle 44 is provided to prevent the exiting gas bubbles 36 from encountering the separated liquid/solid phase 42 of the slurry 34.

Figure 3:
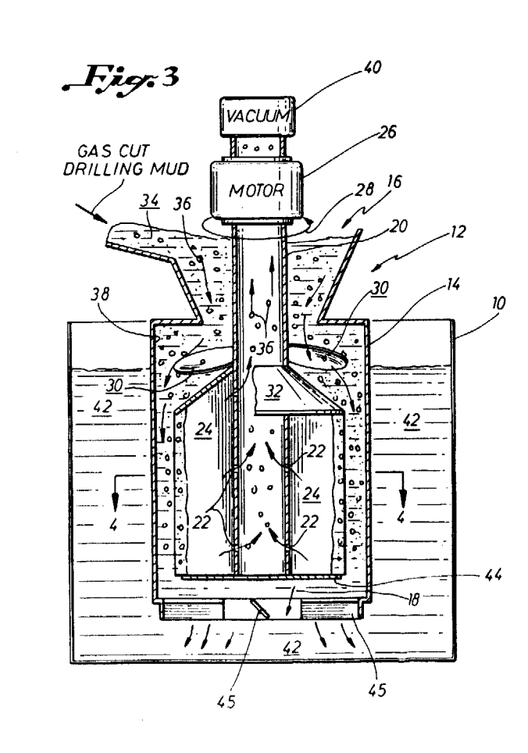
FIG. 3 is a cross-sectional view of a centrifugal degasser in accordance with the present invention and including a vacuum means for exiting gas bubbles.

Referring now to FIG. 3 a centrifugal degasser 12 is illustrated in a manner similar to that of FIG. 2 but including reaction vanes 44. The reaction vanes 44 are connected to the bottom of the casing 14 for purposes of conversion of the rotary motion of the degassed drilling mud 42 into an axial motion. This conversion will enhance mud flow through the casing 14.

Figure 4:
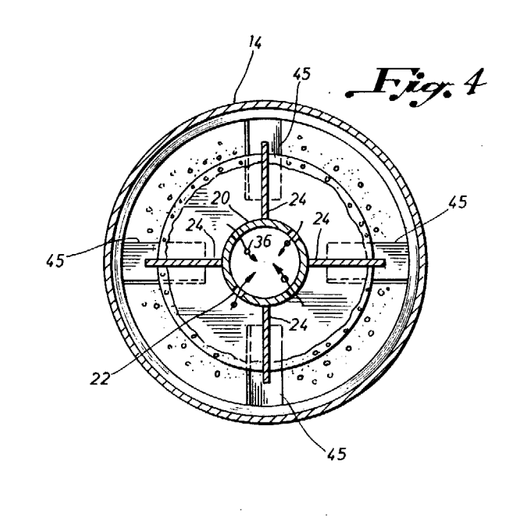
FIG. 4 is a cross-sectional view of paddles taken through section 4-4 of FIG. 3.

FIG. 4 is a sectional view of FIG. 3 further illustrating the interrelationships of the paddles 24 connected to the rotatable hollowed shaft 20 and the annular casing 14. FIG. 4 further demonstrates the relationship of the reaction vanes 44 and the shaft/paddle combination. The gas bubbles 36 are illustrated as rising through the center of the hollowed shaft 20. The gas bubbles 36 are caused to move radially to the surface of the mud in the annulus due to buoyancy in the centrifugal force field and to collect in the vortex center as free gas.

Figure 5:
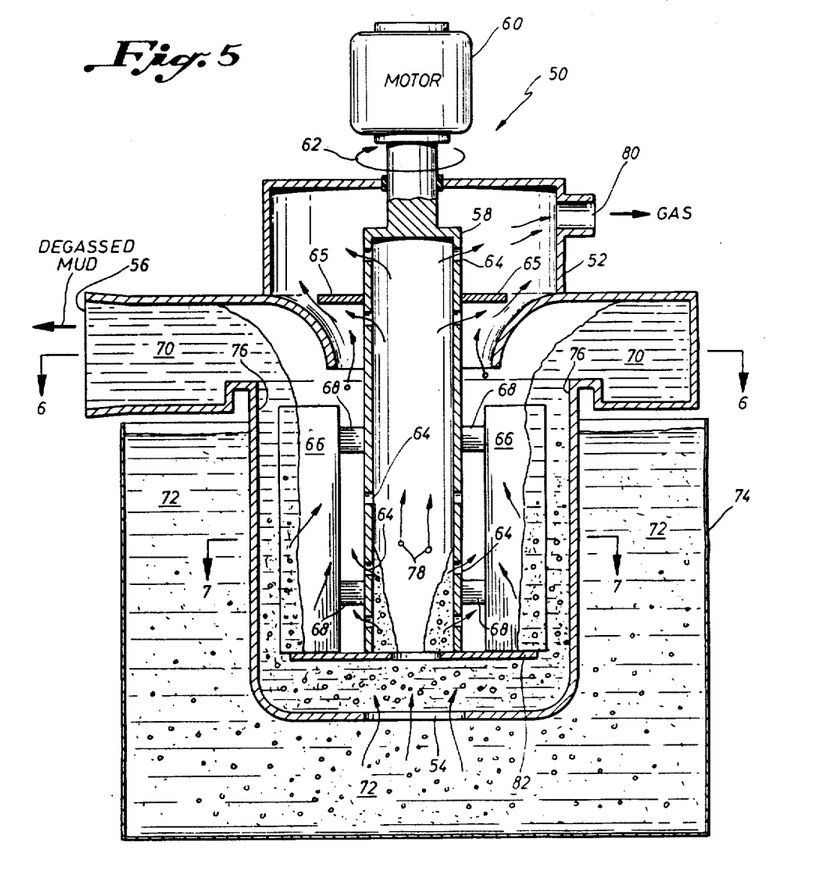
FIG. 5 is a cross-sectional view of the preferred embodiment of the centrifugal degasser of the present invention.

A preferred embodiment of the centrifugal degasser of the present invention is illustrated in FIGS. 5-9. FIG. 5 is a cross-sectional view of the centrifugal degasser 50 including an annular casing 52 and an inlet 54 and outlet 56. As in the embodiment shown in FIGS. 1-4, the preferred embodiment may also have a rotatable hollowed shaft 58 which is driven by a motor 60 in direction 62. The hollowed shaft 58 is provided with a series of apertures 64. The apertures 64 provide a flow path for exiting gas bubbles to the atmosphere. A flow path for gas bubbles also exists external to the shaft in the vortex center created by the centrifugal force field. Paddles 66 are connected to the rotatable shaft 58 for providing a rotary motion of the gas-cut mud within the casing 52. In the preferred embodiment, the paddles 66 are connected by a series of flanges 68 to the rotatable shaft 58. The degasser 50 further includes an annular spillover chamber 70 having a dimension 8-10 inches greater than the diameter of the casing 14. The spillover chamber 70 receives the degassed mud having a rotational velocity from the rotary motion of the paddle 66. This rotational velocity is used to accelerate the discharge of the degassed mud through the outlet 56.

Operationally, the preferred embodiment of the centrifugal degasser 50 receives gas-cut mud 72 from the mud pit 74 to be delivered to the casing 52. The gas-cut mud 72 is then rotated within the casing by the paddles 66 such that the heavier liquid/solid phase of the gas-cut mud is moved toward the inside wall 76 of the casing 52 while the gas phase of the gas-cut mud 72 is separated and delivered to the atmosphere through a flow path in the center of the rotatable shaft 58 and through a flow path in the vortex center external to the shaft to opening 80 as a result of the centrifugal force field.

The drilling mud 72 received by the degasser 50 through inlet 54 is gas-cut mud, i.e., a flowable material having entrained gas bubbles. The rotatable shaft 58 is provided with a hollowed section with intermittent apertures 64 to allow these gas bubbles 78 to escape to the atmosphere. The apertures 64 prevent binding of the inlet 54 in a vapor lock condition, resulting from the entrained gas collecting in a pocket at the inlet 54 with no means of escape to the atmosphere.

Mud guards 65 are connected to the rotatable shaft 58 for preventing the flowable materials from clogging the gas outlet 80. The mud guards 65 are extended from the shaft to allow a small opening between the spillover chamber 70 and shaft 58 for gas release.

A bottom baffle seal 82 may also be provided to prevent gas bubbles 78 from escaping back into the gas-cut slurry 72.

Figure 6:
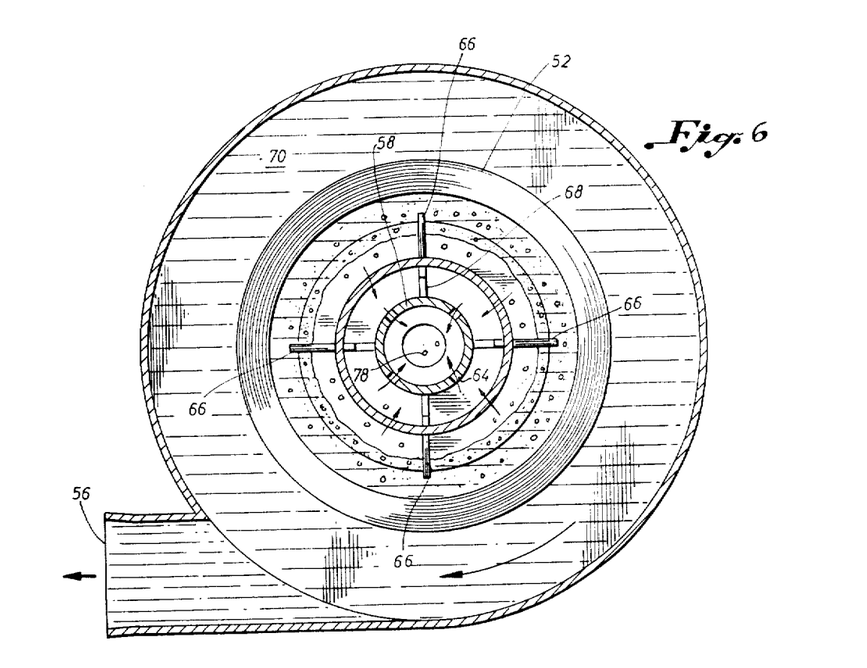
FIG. 6 is a cross-sectional view of the spillover chamber shown in FIG. 5 taken through section 6-6.

FIG. 6 is a sectional view of the centrifugal degasser 50 further illustrating the annular spillover chamber 70 connected to the outlet port 56.

Figure 7:
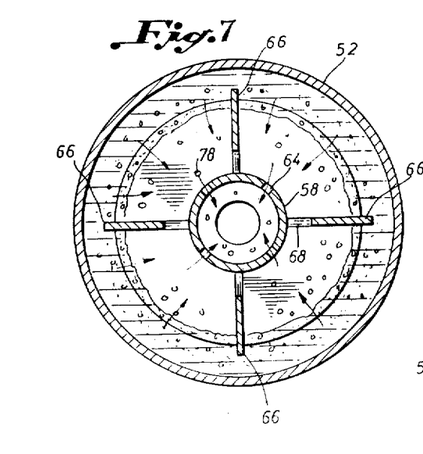
FIG. 7 is a cross-sectional view of the lower chamber and vanes of the preferred embodiment taken through section 7-7.

FIG. 7 further illustrates the movement of the gas bubbles 78 toward the rotational shaft 58 and through the apertures 64 in the shaft 58.

Figure 8:
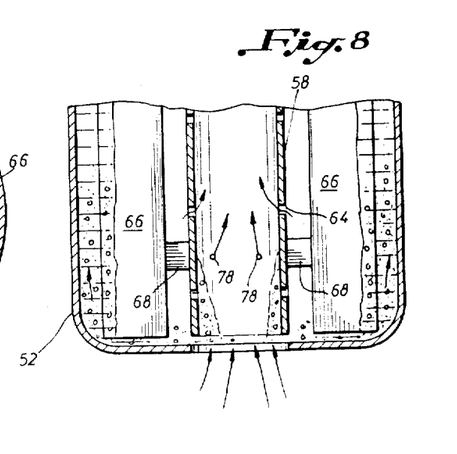
FIG. 8 is a detail view of the bottom of said paddles with regard to the bottom of said casing; and, FIG. 9 is a cross-sectional view of the preferred embodiment of the centrifugal degasser including anti-swirl vanes.

FIG. 8 demonstrates the device 50 without the bottom seal baffle 82 such that the shaft 58 and the paddles 66 extend down toward the bottom of the casing 52 thus using the bottom of the casing to prevent escape of the separated gas bubbles 78.

As the mud and gas are rotated due to the paddle blades 66, the centrifugal forces cause the flow to be radially outward and the gas swept along with the mud 72. This high velocity mud has both a radial and tangential component and is forced past the bottom seal baffle 82 shown in FIG. 5 into the region of the paddles 66. The rotating paddle 66 maintain the rotary motion and forms a vortex. This vortex is maintained over the height of the casing and causes the mud to flow upward in an annular flow pattern. The gas bubbles 78 will travel toward the axis of rotation due to the high buoyant force in the centrifugal force field. The free gas 78 collects in the vortex center and flows either out the apertures 64 or external to the shaft in the vortex center, to the atmosphere. The vaccum shown in FIGS. 1-4 may also be interconnected with the device 50 for enhancing the exhaustion of the gas bubbles 78 to the atmosphere.

Figure 9:
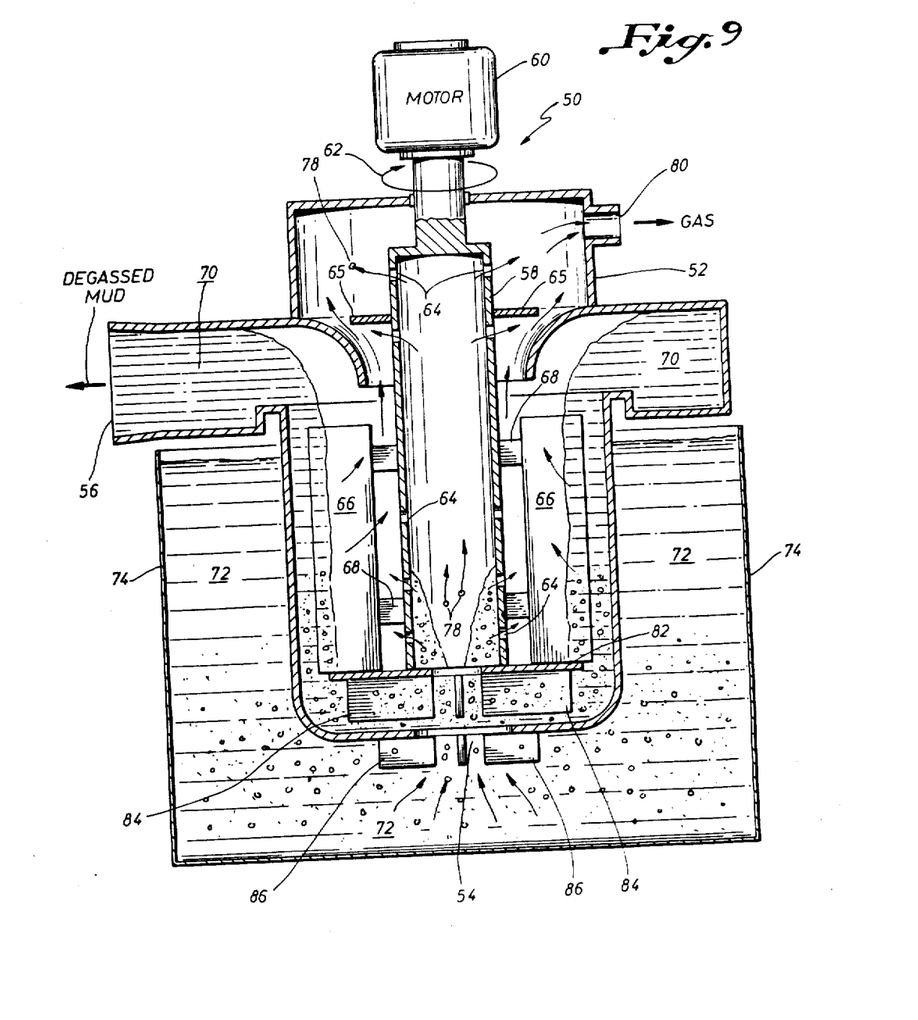

FIG. 9 illustrates the preferred embodiment of the centrifugal degasser of the present invention shown in FIG. 5-8 further including an impeller 84 utilized in a similar manner to the propeller 30 of FIG. 3 described above. The impeller 84 will draw the gas-cut drilling mud 72 from the mud pit 74 into the casing 52 for the degassing process. The impeller 84 is also connected to the rotatable shaft 52 just below the bottom seal baffle plate 82.

The plurality of paddles 66 in combination with the impeller 84 provide an extreme rotational velocity to the drilling mud as it enters the casing, further inducing not only a vortex but also a rotary motion of the gas-cut drilling mud 72 just outside the inlet port 54. To diminish the effects of the rotation of the impeller 84 and plurality of paddles 66 upon the gas-cut mud 72 found outside the device 50, anti-swirl vanes 86 may be provided. The anti-swirl vanes 86 will provide an axial movement of the gas-cut mud as it is drawn into the casing 52 by the impeller 84.

While the present invention has been described with respect to a preferred embodiment, it will be apparent to those skilled in the art that many changes and modifications may be made to these embodiments without departing from the spirit and scope of the invention as set forth in the appended claims.

What is claimed is:

1. A centrifugal degasser for use in degassing gas-cut drilling mud comprising:

a casing having an inlet port for receiving said gas-cut drilling mud and an outlet port for discharging degassed drilling mud;

a rotatable shaft disposed longitudinally within said casing, said rotatable shaft directly communicating with said inlet port to provide an exit for entrained gas within said gas-cut drilling mud;

a plurality of accelerating paddles disposed along the longitudinal axis of said rotatable shaft and attached thereto for moving said drilling mud in a rotary motion, thereby creating a centrifugal force field and a vortex within said drilling mud such that the drilling mud moves axially toward the outlet port with the heavier liquid/solid phase of the drilling mud directed toward the inside wall of said casing, and the gas dispersed within said drilling mud escaping from said drilling mud toward the shaft to discharge from the casing at the outlet port; and means for driving said rotatable shaft connected to said rotatable shaft and operably associated therewith.

2. A centrifugal degasser for use in degassing gas-cut drilling mud comprising:

a casing including a first and second chamber, wherein said first chamber includes an inlet port for receiving said gas-cut drilling mud, and said second chamber includes an outlet port for discharging degassed drilling mud, said second chamber having a diameter greater than said first chamber;

a rotatable shaft disposed longitudinally within said casing, said rotatable shaft in direct communication with said inlet port to provide for the exit of entrained gasses within said gas-cut drilling mud;

a plurality of accelerating paddles disposed within said first chamber along the longitudinal axis of said rotatable shaft and attached thereto for moving said drilling mud in a rotary motion, thereby creating a centrifugal force field and a vortex within said drilling mud such that the drilling mud moves axially toward said second chamber with the heavier liquid/solid phase of the drilling mud directed toward the inside wall of said first chamber, and the gas dispersed within said drilling mud escaping from said drilling mud toward the shaft to discharge from the second chamber outlet port; and means for driving said rotatable shaft connected to said rotatable shaft and operably associated therewith.

3. A centrifugal degasser for use in degassing gas-cut drilling mud comprising:

a casing having first and second chambers, wherein said first chamber includes an inlet port in axial relationship thereto for receiving said gas-cut drilling mud, said second chamber, in spaced relationship with said first chamber, having a tangential outlet port for discharging degassed drilling mud, and said second chamber having a diameter greater than said first chamber to provide a delay in exiting of the degassed drilling mud for allowing a sufficient pressure build-up within said second chamber to cause a tangential discharge from said second chamber;

a rotatable shaft disposed longitudinally within said casing, said rotatable shaft in direct communication with said inlet port to enable thereby creating a centrifugal force field and a vortex within said drilling mud such that the drilling mud moves axially toward said second chamber with the heavier liquid/solid phase of the drilling mud directed toward the inside wall of said first chamber, and the gas dispersed within said drilling mud escaping from said drilling mud toward the shaft to discharge from the second chamber outlet port; and, means for driving said rotatable shaft connected to said rotatable shaft and operably associated therewith.

4. A centrifugal degasser for use in degassing gas-cut drilling mud comprising:

a casing having first and second annular chambers, wherein said first chamber includes an inlet port in axial relationship thereto for receiving said gas-cut drilling mud, said second chamber, in spaced relationship with said first chamber, having an outlet port tangential to said second chamber for discharging degassed drilling mud, and said second chamber having a diameter greater than said first chamber to provide a delay in exiting of the degassed drilling mud for allowing a sufficient pressure build-up within said second chamber to cause a tangential discharge from said second chamber;

a rotatable shaft disposed longitudinally within said casing, said rotatable shaft in direct communication with said inlet port to enable withdrawal of entrained gasses from said gas-cut drilling mud, thus avoiding vapor locking of said degasser;

a plurality of accelerating paddles disposed within said first chamber along the longitudinal axis of said rotatable shaft and attached thereto for moving said drilling mud in a rotary motion, thereby creating a centrifugal force field and a vortex within said drilling mud such that the drilling mud moves axially toward said second chamber with the heavier liquid/solid phase of the drilling mud directed toward the inside wall of said first chamber, and the gas dispersed within said drilling mud escaping from said drilling mud toward the shaft to discharge from the second chamber outlet port; and, means for driving said rotatable shaft connected to said rotatable shaft and operably associated therewith.

5. A centrifugal degasser set forth in any of claims 1, 2-4 further including a bottom seal baffle positioned adjacent and perpendicular to said rotatable shaft for preventing escape of exiting gas.

6. A centrifugal degasser as set forth in any of claims 1, 2-4 wherein said casing inlet port is located in spaced relationship below said outlet port.

7. A centrifugal degasser as set forth in any of claims 1, 2-4 further including a means for propelling said material toward the inside wall upon entry into said casing.

8. A centrifugal degasser as set forth in any of claims 1, 2-4 wherein said paddles have a geometrical oblong shape.

9. A centrifugal degasser as set forth in any of claims 1, 2-4 wherein said paddles have a rectangular shape.

10. A centrifugal degasser as set forth in any of claims 1, 2-4 wherein said paddles have a trapezoidal shape.

11. The centrifugal degasser as set forth in any of claims 1, 2-4 wherein said inlet and outlet ports each have predefined diameters such that there is a differential pressure between the inside of said casing and the outside of said casing to provide a pressure feed of said gas-cut drilling mud into the casing.

12. The centrifugal degasser as set forth in any of claims 1, 2-4 wherein said rotatable shaft is hollowed and has a series of apertures intermittently spaced for providing a flow path for gas bubbles entrained in said gas-cut drilling mud.

13. The centrifugal degasser as set forth in any of claims 1, 2-4 further including a vacuum device to draw off the gas bubbles from said gas-cut drilling mud into the atmosphere.

* * * * *

UNITED STATES PATENT AND TRADEMARK OFFICE
CERTIFICATE OF CORRECTION

PATENT NO. : 4,326,863

DATED : April 27, 1982

INVENTOR(S) : Roger W. Day et al.

It is certified that error appears in the above-identified patent and that said Letters Patent is hereby corrected as shown below:

The sheet of drawing consisting of Figures 1 and 2 should be cancelled and the attached sheets showing Figures 1 - 9 substituted therefor.

Signed and Sealed this

Sixteenth Day of August 1983

[SEAL]

Attest:

Attesting Officer

GERALD J. MOSSINGHOFF

Commissioner of Patents and Trademarks